US012092724B2

(12) United States Patent
Yu et al.

(10) Patent No.: US 12,092,724 B2
(45) Date of Patent: Sep. 17, 2024

(54) OBJECT RANGE AND VELOCITY DETECTION FROM VARYING RADAR PULSE REPETITION TIMES

(71) Applicant: Aptiv Technologies AG, Schaffhausen (CH)

(72) Inventors: Xining Yu, Kokomo, IN (US); James Fredrick Searcy, Westfield, IN (US); Zhengzheng Li, Agoura Hills, CA (US)

(73) Assignee: Aptiv Technologies AG, Schaffhausen (CH)

( * ) Notice: Subject to any disclaimer, the term of this patent is extended or adjusted under 35 U.S.C. 154(b) by 453 days.

(21) Appl. No.: 17/019,320

(22) Filed: Sep. 13, 2020

(65) Prior Publication Data

US 2024/0201358 A1 Jun. 20, 2024

Related U.S. Application Data

(60) Provisional application No. 62/902,081, filed on Sep. 18, 2019, provisional application No. 62/901,378, filed on Sep. 17, 2019.

(51) Int. Cl.
*G01S 13/58* (2006.01)
*G01S 7/41* (2006.01)
(Continued)

(52) U.S. Cl.
CPC ............ *G01S 13/582* (2013.01); *G01S 7/415* (2013.01); *G01S 13/42* (2013.01); *G01S 13/931* (2013.01)

(58) Field of Classification Search
CPC ........ G01S 13/582; G01S 7/415; G01S 13/42; G01S 13/931; G01S 13/24; G01S 7/021;
(Continued)

(56) References Cited

U.S. PATENT DOCUMENTS 4,730,189 A * 3/1988 Siegel .................. G01S 13/225
342/194
5,534,866 A * 7/1996 Rose ....................... G01S 7/021
342/99
(Continued)

FOREIGN PATENT DOCUMENTS

CN 101313229 A 11/2008
CN 102741704 A 10/2012
(Continued)

OTHER PUBLICATIONS

Chornoboy E.S., et al., "Variable-PRI Processing for Meterologic Doppler Radars", IEEE, 1994, pp. 85-90. Feichtinger H.G., et al., "Efficient Numerical Methods in Non-Uniform Sampling Theory", Numerische Mathematik, Germany, 1995, pp. 423-440. (Year: 1994).*

(Continued)

*Primary Examiner* — Olumide Ajibade Akonai
(74) *Attorney, Agent, or Firm* — Harness, Dickey & Pierce, P.L.C.

(57) ABSTRACT

The techniques of this disclosure relate to object range and velocity detections from varying radar pulse repetition times. A device includes a transmitter, a receiver, and a processor. The transmitter is configured to transmit a series of electromagnetic pulses within a frame having a varying pulse repetition time between electromagnetic pulses. A center frequency of the electromagnetic pulses varies by a frequency step. The receiver is configured to receive a series of corresponding reflected electromagnetic pulses reflected from an object. The processor is configured to determine range and velocity information of the object based on the received series of corresponding reflected electromagnetic pulses. By varying the pulse repetition times between consecutive pulses in a radar frame, the radar system may improve a range resolution, particularly in the case of (Continued)

frequency-modulated continuous-wave (FMCW) radar systems.

23 Claims, 9 Drawing Sheets

(51) Int. Cl.
*G01S 13/42* (2006.01)
*G01S 13/931* (2020.01)

(58) Field of Classification Search
CPC .............. G01S 13/9092; G01S 13/343; G01S 13/227; G01S 13/225; G01S 7/2923; G01S 13/222; G01S 7/484; G01S 13/76; G01S 13/003; G01S 13/22; G01S 13/345; G01S 13/584; G01S 13/904; G01S 13/90; G01S 7/36; G01S 7/023; G01S 7/282; G01S 13/282; G01S 7/524
See application file for complete search history.

(56) References Cited

U.S. PATENT DOCUMENTS

| | | | | |
|---|---|---|---|---|
| 5,565,870 | A * | 10/1996 | Fukuhara | G01S 7/2926 |
| | | | | 342/72 |
| 6,147,638 | A | 11/2000 | Rohling et al. | |
| 6,621,450 | B1 * | 9/2003 | Carter | G01S 13/227 |
| | | | | 342/159 |
| 7,466,262 | B2 * | 12/2008 | Stephens | G01S 3/72 |
| | | | | 342/146 |
| 8,026,843 | B2 | 9/2011 | Winkler | |
| 10,324,164 | B1 * | 6/2019 | Daly | G01S 7/021 |
| 2002/0147544 | A1 * | 10/2002 | Nicosia | G01S 13/913 |
| | | | | 701/16 |
| 2004/0077306 | A1 * | 4/2004 | Shor | H04B 1/7174 |
| | | | | 398/1 |
| 2005/0035903 | A1 * | 2/2005 | Bergkvist | G01S 13/22 |
| | | | | 342/91 |
| 2005/0253748 | A1 * | 11/2005 | Brookner | G01S 13/44 |
| | | | | 342/149 |
| 2008/0088499 | A1 * | 4/2008 | Bonthron | G01S 13/931 |
| | | | | 342/104 |
| 2008/0284641 | A1 | 11/2008 | Spreadbury | |
| 2009/0237292 | A1 * | 9/2009 | Tigrek | G01S 13/582 |
| | | | | 342/109 |
| 2009/0278727 | A1 | 11/2009 | Inaba | |
| 2012/0112952 | A1 | 5/2012 | Logan et al. | |
| 2012/0242530 | A1 | 9/2012 | Luebbert et al. | |
| 2018/0059216 | A1 * | 3/2018 | Onic | G01S 13/34 |

FOREIGN PATENT DOCUMENTS

| | | | | |
|---|---|---|---|---|
| EP | 529704 | A1 * | 3/1993 | G01S 13/10 |
| EP | 1775600 | | 4/2007 | |
| JP | 2005009979 | A | 1/2005 | |
| JP | 2009257884 | A | 11/2009 | |
| JP | 2018059953 | A * | 4/2018 | |

OTHER PUBLICATIONS

"Foreign Office Action", EP Application No. 20196482.2, Jun. 22, 2023, 9 pages.
Hu, et al., "A Novel Approach to Synthesize the Range Profile via Predesigned Stepped-Frequency Waveforms", 2010 2nd International Conference on Computer Engineering and Technology, vol. 5, pp. 363-366, 2010, 4 pages.
Wehner, "High-Resolution Radar", Second Edition, Artech House Publishers, ISBN 0-89006-727-9, 1994, 610 pages.
"Extended European Search Report", EP Application No. 20196482.2, Feb. 2, 2021, 16 pages.
Inaba, "Interference Suppression in FMICW Radar with Staggered Pulse Repetition Interval", Dec. 2005, pp. 86-100.
Chinese Office Action regarding Patent Application No. 202010981301.2, dated Dec. 5, 2023.

* cited by examiner

OBJECT RANGE AND VELOCITY DETECTION FROM VARYING RADAR PULSE REPETITION TIMES

CROSS-REFERENCE TO RELATED APPLICATIONS

This application claims the benefit of U.S. Provisional Application No. 62/901,378 filed Sep. 17, 2019, and U.S. Provisional Application No. 62/902,081 filed Sep. 18, 2019, the disclosures of which are hereby incorporated by reference in their entirety herein.

BACKGROUND

Vehicle radar systems typically use frequency modulated continuous wave (FMCW) transmissions to detect objects around a vehicle. Discriminating between adjacent targets may be a challenge for the radar system, particularly in terms of velocity and/or range. Increasing a range resolution of the radar enhances the radar system to better discriminate between two adjacent targets, which may result in reduced performance of Doppler coverage and range coverage.

SUMMARY

This document describes one or more aspects of object range and velocity detection from varying radar pulse repetition times. In one example, a device includes a transmitter, a receiver, and a processor. The transmitter is configured to transmit a series of electromagnetic pulses within a frame having a varying pulse repetition time between electromagnetic pulses. A center frequency of the electromagnetic pulses varies by a frequency step. The receiver is configured to receive a series of corresponding reflected electromagnetic pulses reflected from an object. The processor is configured to determine range and velocity information of the object based on the received series of corresponding reflected electromagnetic pulses.

In another example, a method includes transmitting, with a transmitter, a series of electromagnetic pulses within a frame having a varying pulse repetition time between electromagnetic pulses. A center frequency of the electromagnetic pulses varies by a frequency step. The method also includes receiving, with a receiver, a series of corresponding reflected electromagnetic pulses reflected from an object. The method also includes determining, with a processor, range and velocity information of the object based on the received series of corresponding reflected electromagnetic pulses.

This summary is provided to introduce aspects of object range and velocity detection from varying radar pulse repetition times, which is further described below in the Detailed Description and Drawings. For ease of description, the disclosure focuses on vehicle-based or automotive-based systems, such as those which are integrated on vehicles traveling on a roadway. However, the techniques and systems described herein are not limited to vehicle or automotive contexts, but also apply to other environments where radar can be used to discriminate between objects in close proximity. This summary is not intended to identify essential features of the claimed subject matter, nor is it intended for use in determining the scope of the claimed subject matter.

BRIEF DESCRIPTION OF THE DRAWINGS

The details of one or more aspects of object range and velocity detection from varying radar pulse repetition times are described in this document with reference to the following drawings. The same numbers are used throughout the drawings to reference like features and components.

DETAILED DESCRIPTION

Overview

The techniques of this disclosure relate to object range and velocity detections from varying radar pulse repetition times. By varying the pulse repetition times between consecutive pulses in a radar frame, a radar system may improve a range resolution, particularly in the case of frequency-modulated continuous-wave (FMCW) radar systems. Range resolution is a measure of a radar system's ability to separate objects that are relatively close to one another and have a same bearing or direction of travel. A traditional FMCW chirp pattern has a system bandwidth equal to a chirp bandwidth, and because the bandwidth of the system determines the range resolution, the traditional FMCW system can be limited in its maximum range resolution. Instead of generating the traditional FMCW chirp pattern, a radar system is described where a transceiver generates a multiple-chirp pattern with groupings of multiple chirps having varying pulse repetition times (PRT) within a frame. A frame is defined as a duration of time during which a FMCW chirp pattern has a first period of multiple chirps followed by a second period of idle time. The PRT is defined as a time duration from a start of a pulse to the start of a next pulse. Varying the PRT mitigates a range migration phenomenon, where a peak power of the reflected signal (i.e., a target peak) decreases, and a period widens due to the movement of the target. A finer range resolution tends to make the target peak spread over time, more than a coarse range resolution. Spreading of the target peak may reduce a signal-to-noise ratio and reduce the ability of the radar system to differentiate between two targets.

FMCW radar systems are used to determine the positions, velocities, and angles of the objects around the vehicle. Within the FMCW radar transmitter, the signal is modulated in multiple ramps called chirps and transmitted via a transmitting antenna. After the reflected signal is received by a receiving antenna, the signal is mixed with the transmitted signal, down-converted, and sampled by an Analog-to-Digital Converter (ADC). The resulting digital signal is processed by on-board processors. The location of a processed signal peak in the frequency spectrum is a function of a target relative velocity and a distance from the target to the receiving antenna. In some situations, targets with various velocity and distance would emerge as multiple peaks with different locations in the spectrum.

This disclosure introduces object range and velocity detections from varying radar pulse repetition times. Described is a waveform and processing strategy that decouple a range resolution of a radar system and a sampling rate of an ADC, so that a finer range resolution may be achieved even when using an ADC that has a low sampling speed. In addition, ways of using a stepped-frequency FMCW to unfold an aliased Doppler frequency are disclosed.

Operating Environment

Figure 1:
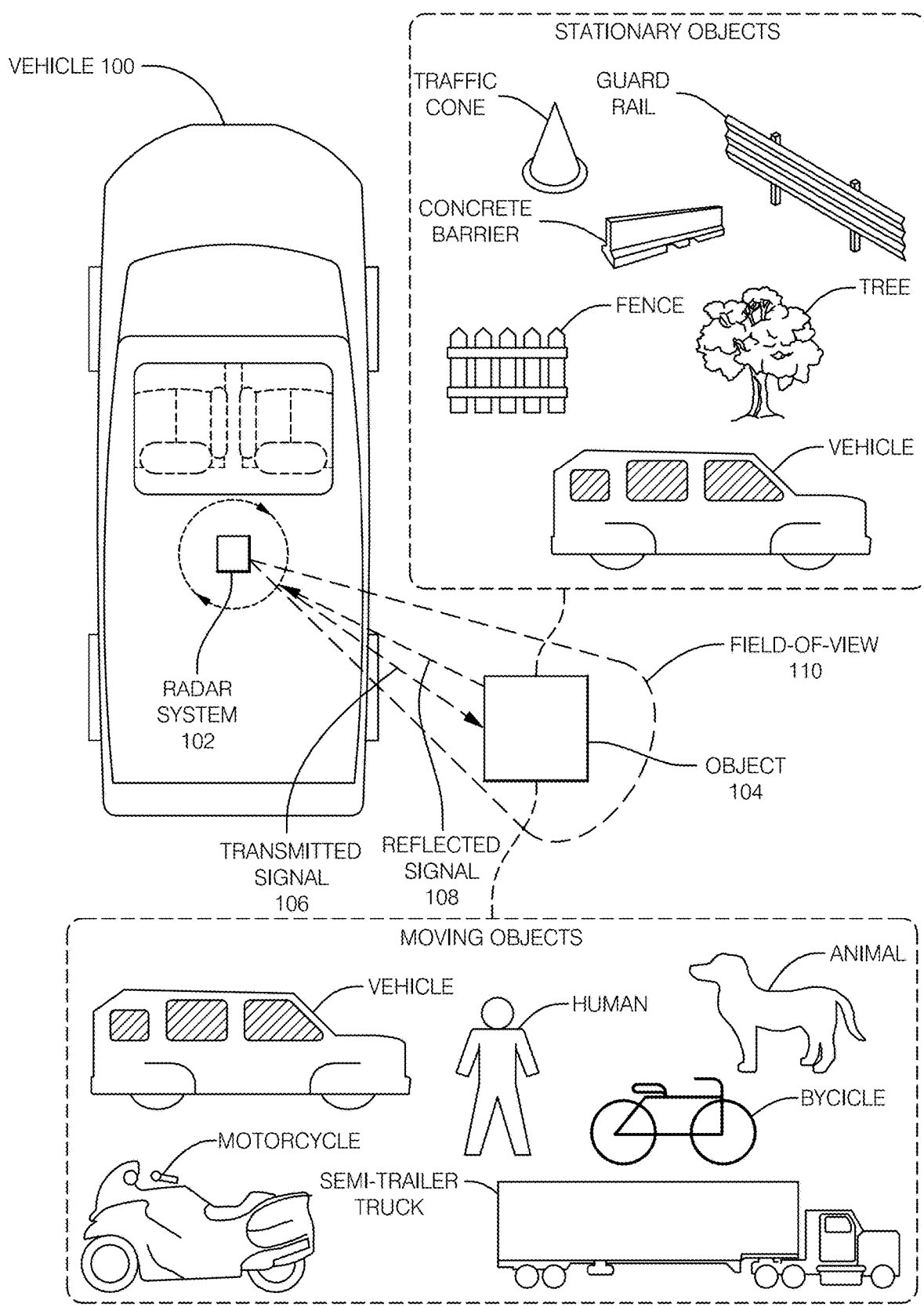
FIG. 1 illustrates an example vehicle in which an example radar system is configured to determine object range and velocity from varying radar pulse repetition times.

FIG. 1 illustrates a vehicle 100 in which an example FMCW radar system 102 can detect objects 104, e.g., humans, animals, other vehicles, and stationary objects such as trees and barriers. Although illustrated as a car, the vehicle 100 can represent other types of motorized vehicles (e.g., a motorcycle, a bus, a tractor, a commercial vehicle, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite).

The FMCW radar system 102 (hereafter referred to as "the radar system 102") is mounted to, or integrated within, the vehicle 100. The techniques and systems described herein are not limited to vehicles or automotive contexts, but also apply to other mobile and non-mobile environments where object detection may be useful, including machinery, robotic equipment, buildings, and other structures.

In the depicted implementation, the radar system 102 is centrally located on an exterior of the vehicle 100. In other implementations, the radar system 102 is distributed around the vehicle 100, such as behind a front and/or rear bumper, or within an interior of the vehicle 100 with a view through windows of the vehicle 100. The radar system 102 transmits radar signals (e.g., transmitted signals 106) and receives radar reflections (e.g., reflected signals 108) in a portion of the vehicle 100 that is encompassed by a field of view 110. The field of view 110 includes one or more areas around the vehicle 100. Example fields of view 110 include a 360-degree field of view, one or more 180-degree fields of view 110, one or more 90-degree fields of view 110, and so forth, which can overlap (e.g., for creating a particular size field of view).

Figure 2:
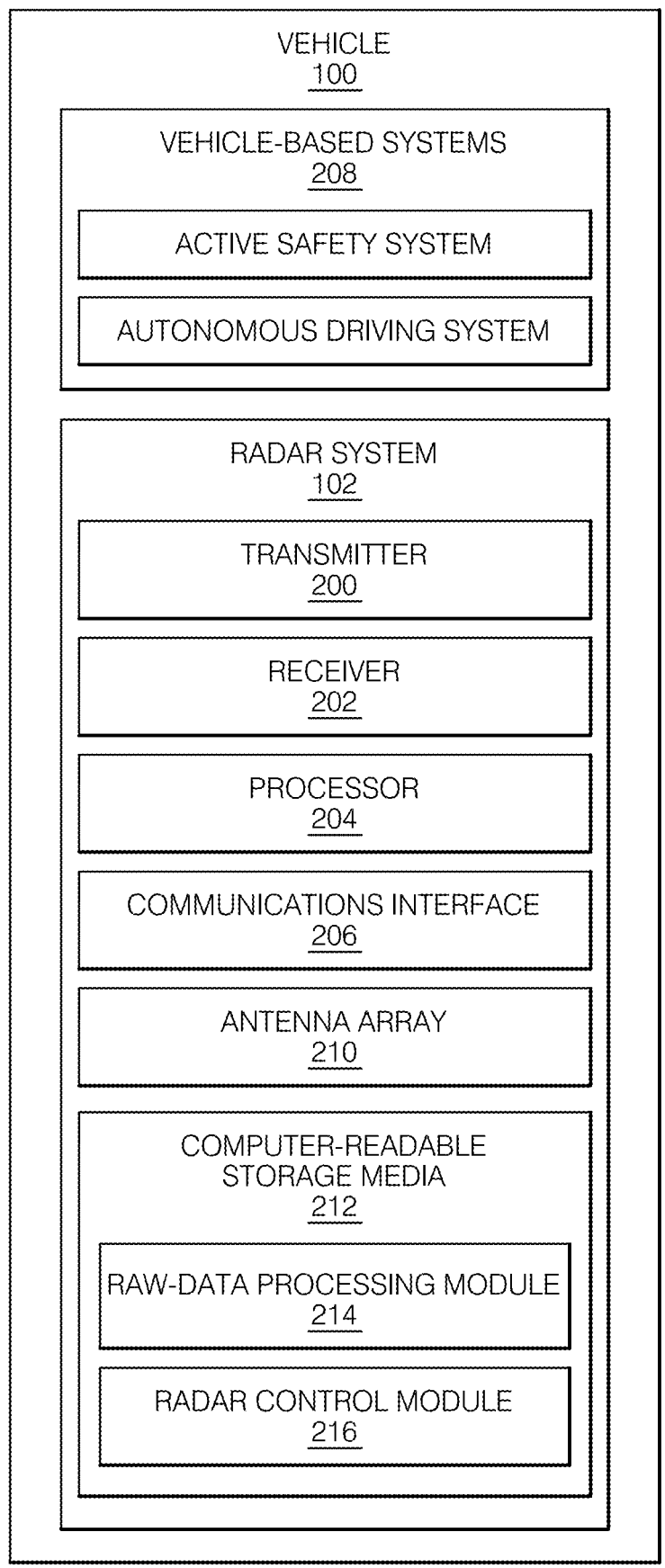
FIG. 2 illustrates an example implementation of an example radar system as part of a vehicle.

FIG. 2 schematically illustrates an example of the radar system 102 installed on the vehicle 100. The system includes a transmitter 200, a receiver 202, and a processor 204. In this example, the processor 204 is configured to be a controller of the transmitter 200 and a signal processor to process reflected signals 108 received by the receiver 202 for object detection. In the example illustrated by FIG. 2, the processor 204 controls the transmitter 200 to use FMCW transmissions.

The radar system 102 includes a communication interface 206 to transmit the radar data to vehicle-based systems 208 or to another component of the vehicle 100 over a communication bus of the vehicle 100. In an example, the individual components shown in the radar system 102 are integrated, including at different positions or locations, within the vehicle 100. In general, the radar data provided by the communication interface 206 is in a format usable by the vehicle-based systems 208, such as active safety systems and autonomous driving systems. The communication interface 206 may provide information to the radar system 102, such as a speed of the vehicle 100, a yaw rate of the vehicle 100, etc.

The radar system 102 also includes at least one antenna array 210 to emit and receive radar signals. The antenna array 210 includes a transmit antenna element, for example, one per each transmit channel. A receive antenna element of the antenna array 210 is coupled to each receive channel to receive the reflected signals 108 in response to the transmitted signals 106. The antenna array 210 may include multiple transmit antenna elements and multiple receive antenna elements to configure the radar system 102 as a MIMO (Multiple Input Multiple Output) radar system capable of transmitting multiple distinct waveforms at a given time (e.g., a different waveform per transmit antenna element). The antenna elements may be circularly polarized, horizontally polarized, vertically polarized, or any combination thereof.

Using the antenna array 210, the radar system 102 may form beams that are steered or un-steered and may be wide beams or narrow beams. The steering and shaping may be achieved through analog beamforming or digital beamforming. The one or more transmitting antenna elements may have an un-steered omnidirectional radiation pattern, or the one or more transmitting antenna elements may produce a wide, steerable beam to illuminate or cover a large volume of space with the transmitted signals 106. To achieve object angular accuracies and angular resolutions, the receiving antenna elements may be used to generate hundreds of narrow steered beams with digital beamforming. In this way, the radar system 102 can efficiently monitor an external environment of the vehicle 100 to detect one or more objects within the field of view 110.

The receiver 202, which may include multiple receivers 202, includes circuitry and logic for transmitting radar signals via the antenna array 210. The transmitter 200 includes one or more transmit channels, and the receiver 202 includes one or more receive channels, which may be of a similar or different quantity than a quantity of the transmit channels. The transmitter 200 and receiver 202 may share a local oscillator (LO) to synchronize operations. The transmitter 200 and receiver 202 may also include other components not shown, such as amplifiers, mixers, phase shifters, switches, ADCs, combiners, and the like.

The transmitter 200 is primarily configured as a continuous-wave transmitter 200 to execute FMCW operations, and it may also include logic to perform in-phase/quadrature (I/Q) operations and/or modulation or demodulation in a variety of ways, including linear-frequency modulations, triangular-frequency modulations, stepped-frequency modulation, or phase modulation. In addition, the transmitter 200 may be configured to support pulsed-radar operations.

In an example, a frequency spectrum (i.e., a range of frequencies) of transmitted signals 106 and reflected signals 108 may encompass frequencies between one gigahertz (1 GHz) and 10 GHz. Bandwidths may be less than 1 GHz, such as between approximately 300 megahertz (300 MHz) and 500 MHz. The frequencies of the transmitter 200 may be also be associated with millimeter wavelengths.

The radar system 102 also includes at least a computer-readable storage media (CRM) 212. The CRM 212 includes a raw-data processing module 214 and a radar control module 216. The raw-data processing module 214 and the radar control module 216 may be implemented using hardware, software, firmware, or a combination thereof. In this example, the processor 204 executes instructions for implementing the raw-data processing module 214 and the radar control module 216. Together, the raw-data processing module 214 and the radar control module 216 enable the processor 204 to process responses from the receive antenna elements in the antenna array 210 to detect the object 104 and generate radar data for the vehicle-based systems 208.

The raw-data processing module 214 transforms receiver 202 signals, including raw data (e.g., digital beat signals including baseband data) provided by the transmitter 200 into radar data (e.g., an amplitude and/or frequency as a function of range and/or velocity) that is usable by the radar control module 216. The radar control module 216 analyzes the radar data obtained over time to map one or more detections, e.g., of objects 104.

The radar control module 220 produces the radar data for the vehicle-based systems 208. Example types of radar data include a Boolean value that indicates whether or not the object 104 is present within a particular region of interest, a number that represents a characteristic of the object 104 (e.g., position, speed, or direction of motion), or a value that indicates the type of object 104 detected. The radar control module 216 configures the radar system 102 to emit radar signals and detect radar reflections via the antenna array 210. The radar control module 220 outputs information associated with the radar reflections detected from radar signals that reach objects, such as the object 104.

Example Architecture

Figure 3:
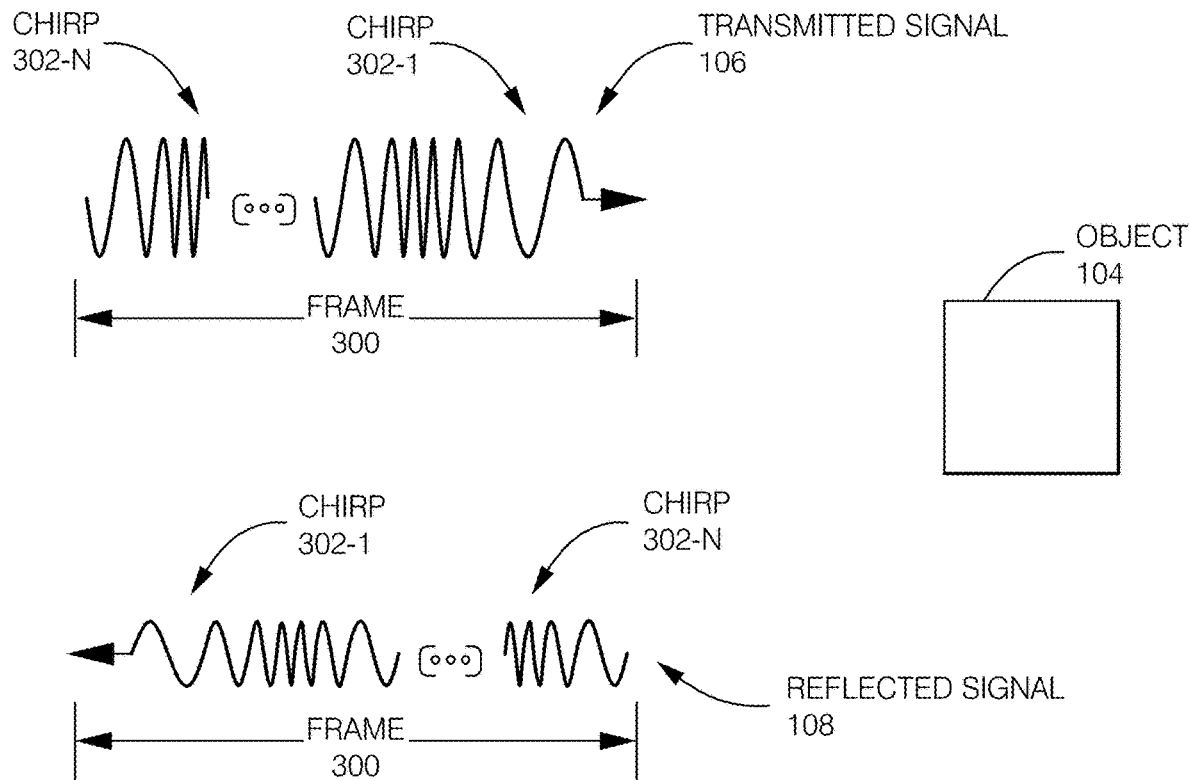
FIG. 3 illustrates an example signal of an example radar system.

FIG. 3 illustrates an example operation of the radar system 102. Within the vehicle 100, the object 104 is located at a particular distance and angle from the antenna array of the radar system 102. To detect the object 104, the radar system 102 transmits and receives the radar signal, which is an example of a frame 300 of the radar signal. The radar signal is transmitted as the transmitted signal 106. At least a portion of the transmitted signal 106 is reflected by the object 104. This reflected portion represents reflected signal 108. The radar system processes reflected signals 108 to extract data for vehicle-based systems 208 illustrated in FIG. 2. As shown in FIG. 3, an amplitude of the reflected signal 108 is smaller than an amplitude of the transmitted signal 106 due to losses incurred during propagation and reflection. Although the transmitted signal 106 is illustrated as having a single waveform, the transmitted signal 106 can be composed of multiple transmitted signals 106 that have distinct waveforms to support MIMO operations.

The transmitted signal 106 includes one or more chirps 302-1 to 302-N, where N represents a positive integer. The radar system 102 can transmit the chirps 302-1, 302-2, . . . , 302-N (collectively "the chirps 302") in a continuous sequence or transmit the chirps as time-separated electromagnetic pulses. The chirps 302, when followed by a period of idle time, represent a frame 300. The transmitted signal 106 can include a quantity of M frames 300, where M represents a positive integer.

Individual frequencies of the chirps 302 can increase or decrease over time, and the slope or rate of change in the individual frequencies of the chirps 302 may also increase or decrease over time within the frame 300. In general, transmission characteristics of the chirps 302 (e.g., bandwidth, center frequency, duration, and transmit power) can be tailored to achieve a particular detection range, range resolution, or Doppler coverage for detecting the object 104.

At the radar system 102, the reflected signal 108 represents a delayed version of the transmitted signal 106. The amount of delay is proportional to the distance from the antenna array 210 of the radar system 102 to the object 104. In particular, this delay represents a summation of a time required for the transmitted signal 106 to propagate from the radar system 102 to the object 104 and the time required for the reflected signal 108 to propagate from the object 104 back to the radar system 102. If the object 104 and/or the radar system 102 is moving, the reflected signal 108 is shifted in frequency relative to the transmitted signal 106 due to the Doppler effect. In other words, characteristics of the reflected signal 108 are dependent upon motion of the object 104 and/or motion of the vehicle 100. Similar to the transmitted signal 106, the reflected signal 108 is composed of one or more of the chirps 302. The chirps 302 enable the radar system 102 to make multiple observations of the object 104 during each of the frames 300.

Figure 4:
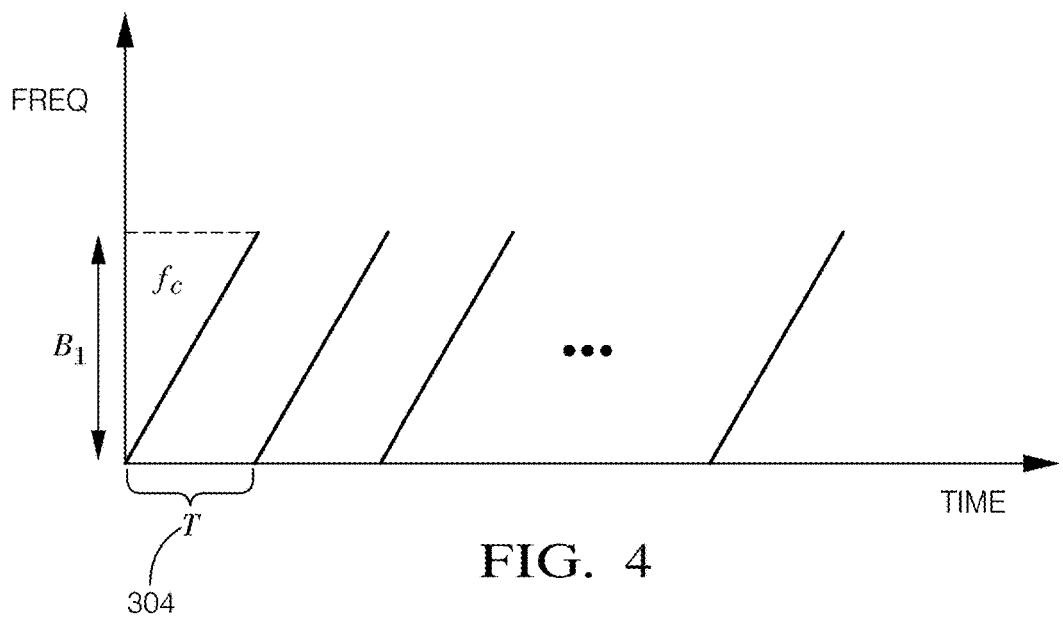
FIG. 4 illustrates a frequency sweep of a transmitted radar signal from an example radar system.

FIG. 4 illustrates an example of the FMCW with multiple chirps in one frame, in which fc is the center frequency for all chirps in one frame, $B_1$ is the chirp bandwidth, and T is the Pulse Repetition Time 304 (PRT 304). In this example, the chirp bandwidth is equal to the frame bandwidth, as there is no frequency step 306 or frequency offset between chirps. When a target is detected in a field of view of the sensor, the transmitted signal is reflected by the target and received by the receiver.

Figure 5:
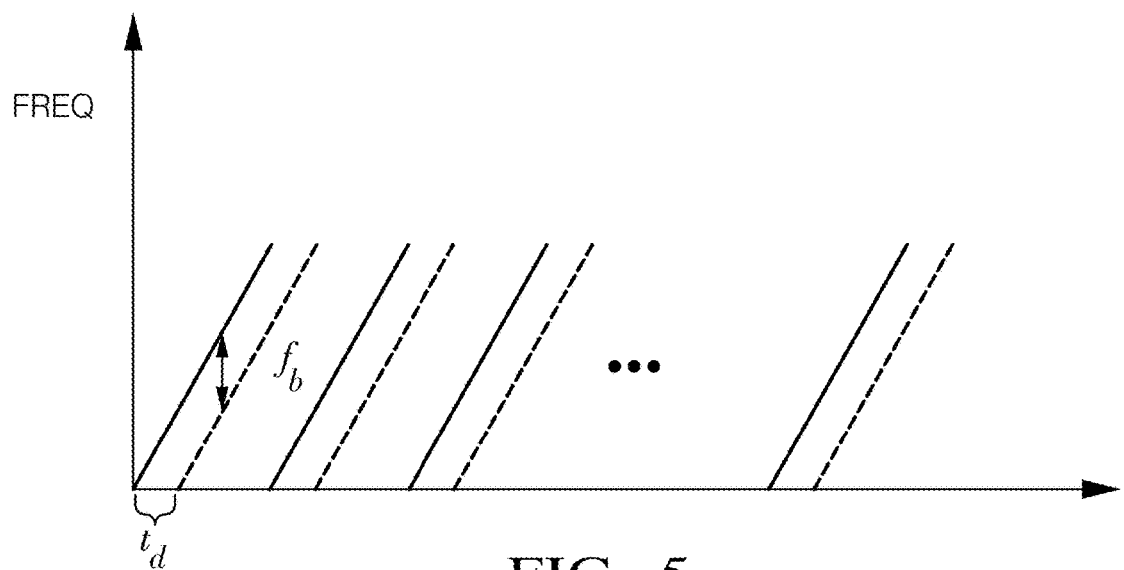
FIG. 5 illustrates a reflected radar signal in response to the transmitted radar signal of FIG. 4.

FIG. 5 illustrates a time lag between the transmitted signals 106 and the received reflected signals 108, where the dashed line represents the reflected signal 108, the solid line represents the transmitted signal 106, and ta represents the time lag between the transmitted signal 106 and reflected signal 108. The reflected signal 108 is mixed with the transmitted signal 106 by the processor 204, and an output of this operation mixing is a signal with the beat frequency fp that is equal to the frequency differences between the transmitted signal 106 and the reflected signal 108. The processor 204 uses ADC to sample the signal and form a two-dimensional Fast Fourier Transformation (2D-FFT) matrix with a dimension of N by M, where N is the number of chirps in one frame, and M is the number of samples of each chirp. The domain containing the M samples is referred to as the first domain (e.g., the fast time domain) the and the domain containing the N chirps is called the second domain (e.g., the slow time domain).

The range information of the target can be found by conducting the FFT on the first domain of the received radar data. The ranging frequency (beat frequency) of the target is defined in Equation (1), $$F_1 = \frac{2kR}{c} + \frac{2v}{\lambda} \qquad (1)$$

where k is a chirp slope, defined as $$k = \frac{B_1}{T},$$

R is a target range, v is a target velocity, $\lambda$ is a wavelength of the transmitted signal 106, and c is the light speed. Since $$\frac{2kR}{c} \ll \frac{2v}{\lambda},$$

typically the Doppler effect on the range frequency would be omitted, and Equation (1) may be written as, $$F_1 \approx \frac{2kR}{c}. \quad (2)$$

The velocity of the target may be determined by conducting the FFT on the second domain of the radar data. The Doppler frequency of the target is defined in Equation (3).

$$F_2 = \frac{2v}{\lambda}. \quad (3)$$

The range resolution of using FMCW is, $$\Delta r_1 = \frac{c}{2B_1}, \quad (4)$$

where $B_1$ is the signal bandwidth, and the unambiguity Doppler coverage is, $$V_{un} = \pm \frac{\lambda}{4T}. \quad (5)$$

The range coverage of the waveform for real-sampling is $$R_{un} = \frac{cf_s}{4k}, \quad (6)$$

where $f_s$ is the ADC sampling rate. It is desirable to have a finer range resolution because a finer range resolution enables the radar system 102 to increase the ability to discriminate two adjacent targets. However, with the known techniques, increasing the range resolution of the system degrades the performance of Doppler coverage and range coverage. For example, if the system needs to have a finer range resolution and maintain the same Doppler and range coverage, $B_1$, k, and $f_s$ have to be increased. But for a given hardware, the maximum $f_s$ of a system is fixed. Even if the range resolution can be increased by using a higher $f_s$, the range migration issue caused by target movement in the first domain would reduce a signal-to-noise ratio (SNR) and increase the spectral spreading.

Examples in this disclosure include techniques for increasing range resolution without sacrificing Doppler coverage or range coverage. Range information from the first domain is used to unfold the aliased range information in the second domain, which maintains the same unambiguous range even when using a higher frequency step 306. In examples described in more detail below, the PRT 304 is varied in a manner that allows for obtaining target range information from each chirp and for obtaining target range and velocity information at the same time. This approach increases efficiencies (e.g., reducing computing resources). In another example, the PRT 304 is staggered and combined with a dual-slope FMCW waveform to increase the Doppler coverage.

Figure 6:
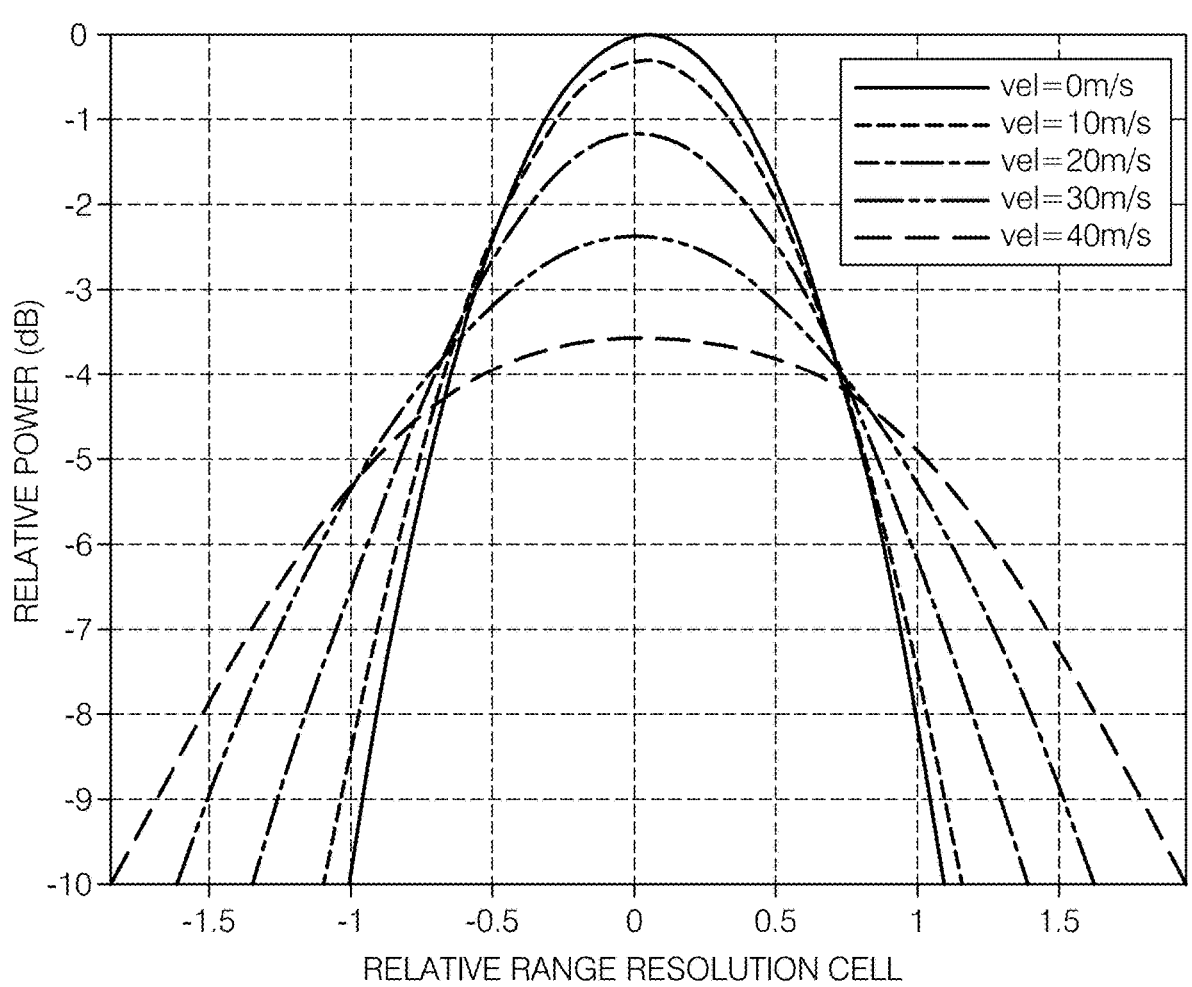
FIG. 6 illustrates an example of a range migration of an example radar system.

FIG. 6 illustrates the range dispersion effect in the second domain. The term, P, which is referred to as a dispersion factor in this disclosure, is the ratio of the amount of relative target motion over one frame to the resolution of second FFT. P is represented by the equation $$P = \frac{vNT}{\Delta r_2},$$

where $\Delta r_2$ is the range resolution in the FFT of the second domain. As shown in FIG. 6, when the velocity of the target increases, the beam width will broaden and the target response will be attenuated (e.g., P increases with increasing velocity). For example, the peaks at velocities of 0-20 m/s are narrower and have a higher amplitude than the peaks at velocities of 30 or 40 m/s. To inhibit such broadening and dispersion, the PRT 304 may be varied, as will be described below in more detail.

Figure 7:
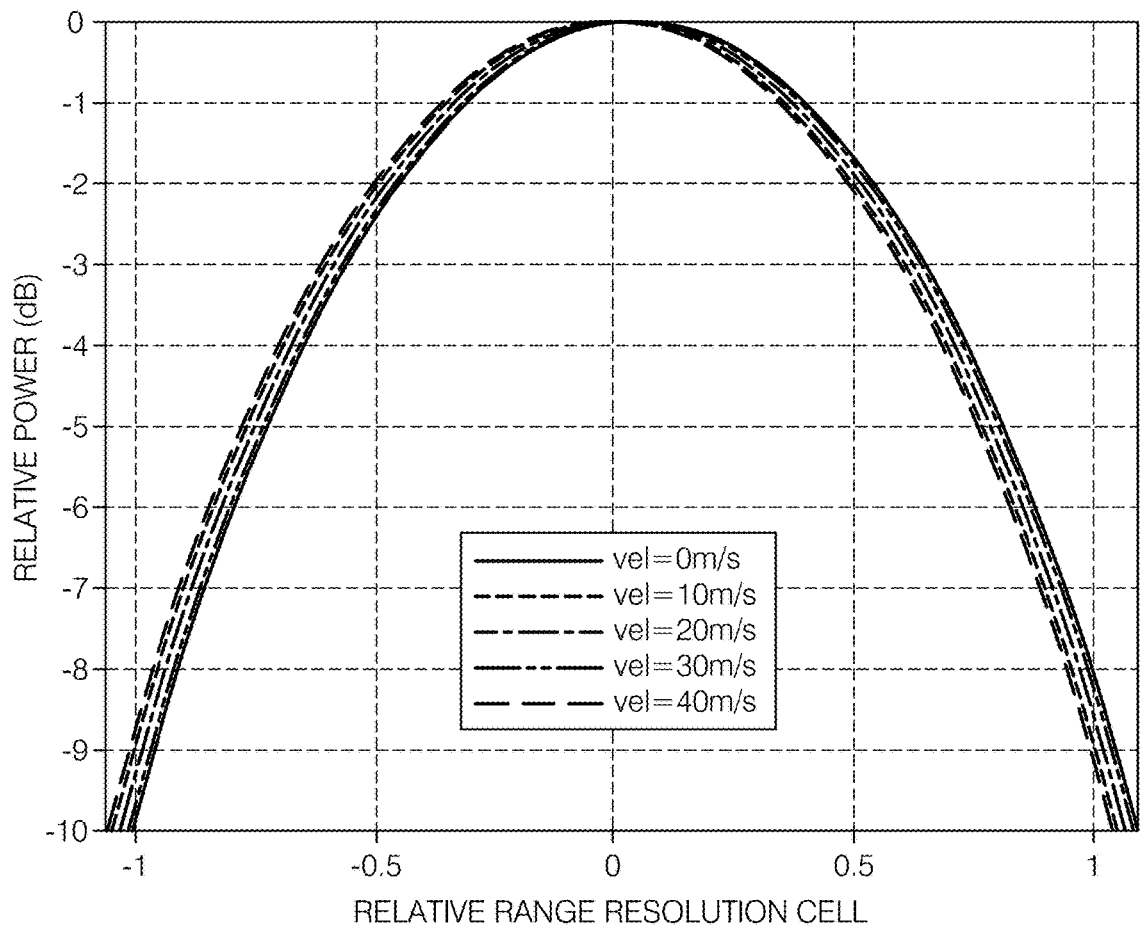
FIG. 7 illustrates an example of a mitigated range migration of an example radar system.

FIG. 7 illustrates an example result in which the range dispersion, P, has been minimized by varying the PRT 304. In the illustrated example, the peaks are essentially identical over the range of 0 m/s to 40 m/s of target velocity. The target frequency in the second domain in this example is determined by the equation, $$F_2 = \frac{2R_0 \Delta f}{cT_0} + \frac{2v}{\lambda_0} = f_{r2}R_0 + f_v v \approx h f_{bin2} \quad (7)$$

where $f_{r2}$ is the ranging coefficient in the second domain, $f_v$ is the Doppler coefficient, h is the target bin index, and $f_{bin2}$ is the bin frequency in the second spectrum. In an example, a fractional bin estimation can be used to make h more accurate, i.e., to make h more closely match the actual location.

The range resolution in the first domain can be determined using the bandwidth of the individual chirps using the equation $$\Delta r_1 = \frac{c}{2B_1}, \quad (8)$$

and the range resolution in the second domain can be determined using the bandwidth of the frame using the equation $$\Delta r_2 = \frac{c}{2B_2}. \quad (9)$$

When two targets are only separated in a range value, which is less than $\Delta r_1$ but larger than $\Delta r_2$, those targets will be separated in the second domain, but not separated in the first domain. So, by using a stepped-frequency waveform where the bandwidths for the individual chirps, $B_1$, and for the frame, $B_2$, are used, the range resolution is increased. In an example, improving (e.g., reducing) the range resolution of the radar system 102 includes increasing $B_2$ in the second domain without changing $B_1$ in the first domain, and setting $\Delta r_1 > \Delta r_2$.

The unambiguous detection range of the first domain is determined by $$R_{un1} = \frac{cf_s}{2k_c}, \quad (10)$$

and unambiguous detection range of the second domain is determined by $$R_{un2} = \frac{cPRF}{2k_f}, \quad (11)$$

in which $PRF=1/T_0$. When $B_2$ is increased, $R_{un2}$ is reduced. To increase the range resolution, setting $\Delta r_1 > \Delta r_2$ would result in $R_{un2} < R_{un1}$. When the target range, R, is within the range of $R_{un2} < R < R_{un1}$, the range frequency would be aliased in the second domain. To get a correct target frequency in the second domain, it is desired to compensate for the folded frequency of Equation (7) as, $$F_2 = \frac{2R_0\Delta f}{cT_0} + \frac{2v}{\lambda_0} + b\Delta f \approx h f_{bin2} + bPRF \quad (12)$$

where b is the number of times that the range frequency has been folded in the second domain. The value of b can be calculated from the following Equation (13)

$$b = \text{floor}\left(\frac{R_1}{R_{un2}}\right) \quad (13)$$

in which $R_1$ is the range estimation in the first domain. So the maximum detection range for the system is determined by Equation (10).

Figure 9:
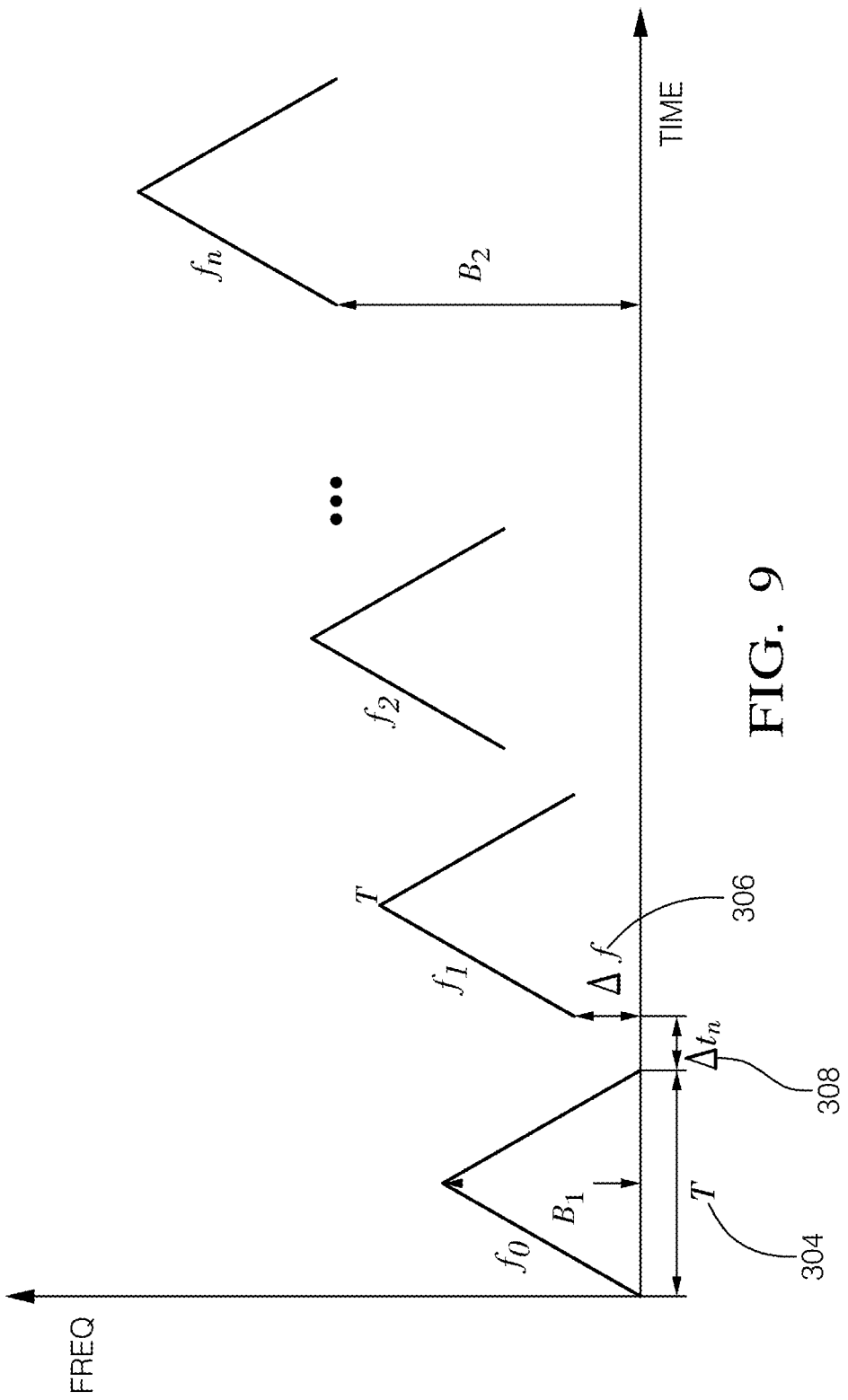
FIG. 9 illustrates an example stepped-frequency waveform of an example radar system.
Figure 11:
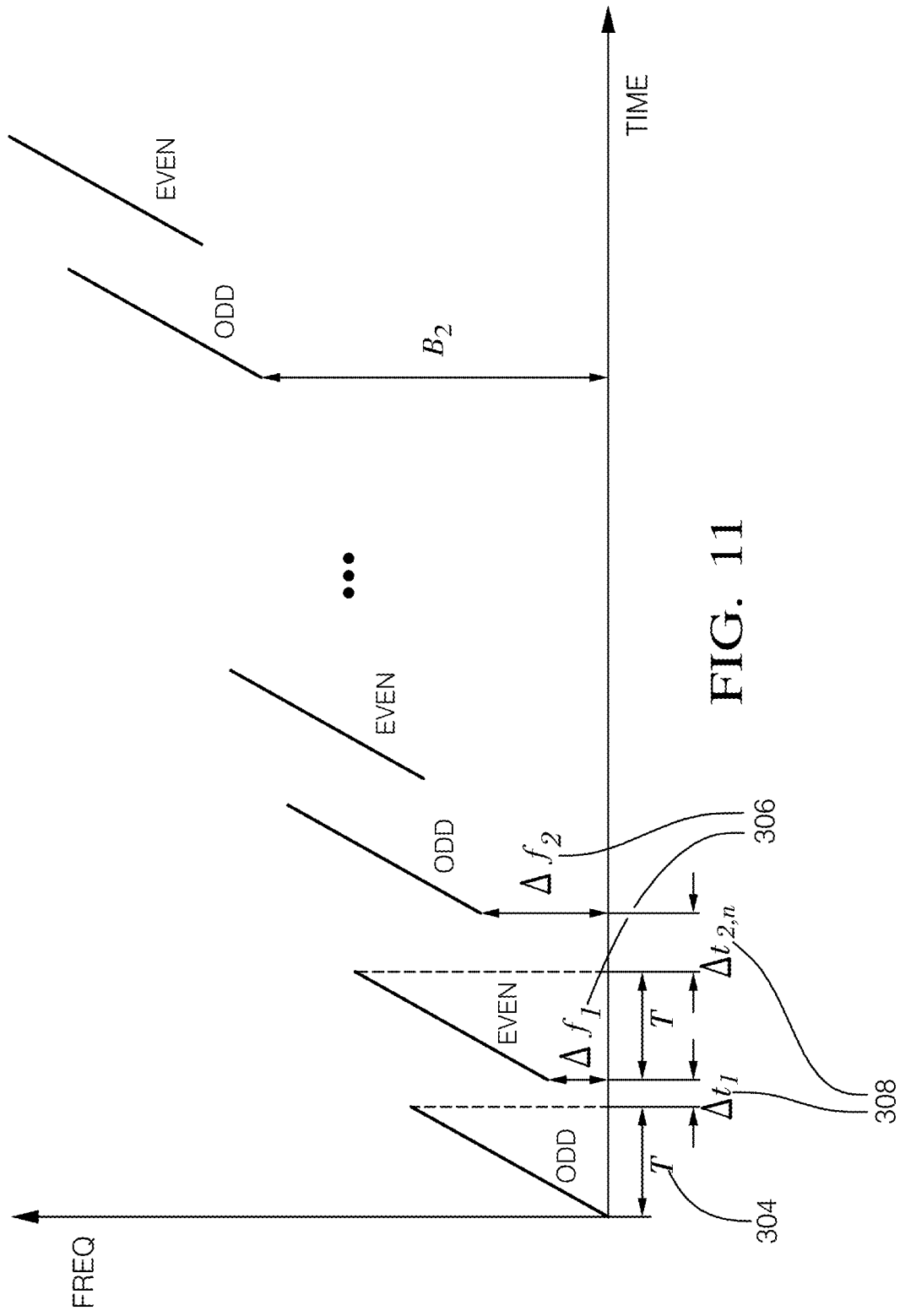
FIG. 11 illustrates another example stepped-frequency waveform of an example FMCW radar system.

Referring back to equation 12, the range and Doppler are coupled. Since the range frequency is much higher than the Doppler frequency, the position of the peak in the first spectrum is mainly dependent on the target position. When $\Delta f = 0$ (e.g., no frequency step 306 as illustrated in FIG. 4), the stepped-frequency waveform becomes a conventional FMCW waveform, in which the second spectrum only contains Doppler frequency, so the zero Doppler frequency is in the center of the spectrum. When $\Delta f \neq 0$ (e.g., including the frequency step 306 as illustrated in FIGS. 9 and 11), the Doppler frequency and range frequency are comparable in the second spectrum, so the target bin index would depend on both range and Doppler frequency of the target, which means the zero Doppler index would move along with the target position. An example embodiment includes finding the Doppler frequency by finding the number of bins that the zero Doppler index, w, has been shifted as caused by the range frequency. The zero Doppler index w can be calculated as, $$w = \left(R_1 - bR_{un2} - \frac{R_{un2}}{2}\right) / r_{bin2}, \quad (14)$$

where $r_{bin2}$ is the range bin resolution in the second spectrum defined as, $$r_{bin2} = \frac{PRF}{2cNk_f}. \quad (15)$$

The positive and negative Doppler velocity may have different coverage, and when these two coverages are different, the bins belonging to a larger coverage may be used as the bins in the smaller coverage. In an example, the velocity of the target is unaliased within the range of $$\frac{-\lambda_0}{4T_0} < v < \frac{\lambda_0}{4T_0}.$$

In this example, a corrected frequency value may be achieved by compensating the index h in the following equation, $$F_2 = \frac{2R_0\Delta f}{cT_0} + \frac{2v}{\lambda_0} + bPRF \approx (h+x)f_{bin2} + bPRF, \quad (16)$$

where x is the compensated index, which can be calculated as shown below.
if (h<w) and (w>0)
 x=x+$N_{fft}$
Else if (h>$N_{fft}$+w) and (w<0)
 x=x−$N_{fft}$
Else
 X=X;

After conducting the 2D-FFT on the received signal v(n, m), the peaks with index (h,g) in the 2D spectrum are associated with the targets, and the target range can be calculated based on $$R=(F_1-F_2)/(f_{r1}-f_{r2}). \quad (17)$$

After obtaining the range of the target, the velocity of the target may be determined by the equation $$V=(F_2-Rf_{r1})/f_{r2}. \quad (18)$$

Figure 8:
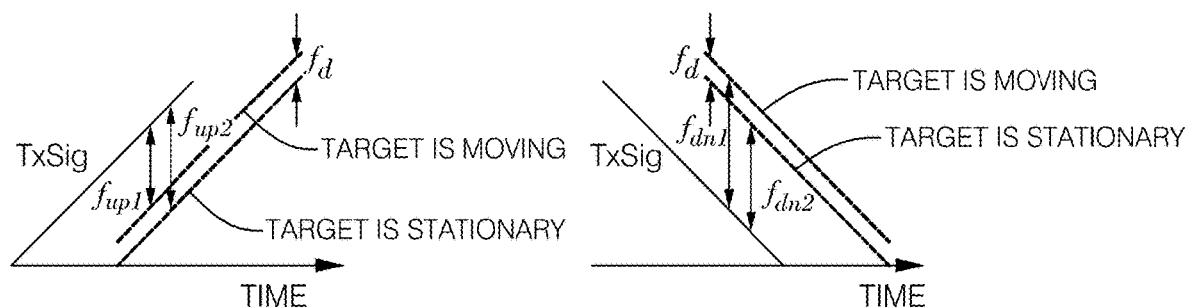
FIG. 8 illustrates an example of a chirp of an example radar system.

FIG. 8 illustrates the Doppler effects on different directions of chirps, in which the solid line is the transmitted signal 106, and the dashed lines are the reflected signal 108. The symbols $f_{up1}$ and $f_{up2}$ represent the beat frequency when the target is stationary or moving in the up-chirp. The symbol fa represents the Doppler frequency shift, and the symbols $f_{an1}$ and $f_{an2}$ represent the beat frequency when the target is stationary or moving in the down-chirp.

$$f_{up1}=f_{up2}+f_a \quad (19)$$

$$f_{an1}=f_{an2}-f_a \quad (20)$$

Equations (19) and (20) give the beat frequency when the target is moving for the up-chirp and down-chirp. Because the Doppler frequency appends onto the beat frequency differently for the ascending and descending frequency slopes, the target frequency, $F_1$, for the down-chirp segment of the FMCW waveform is determined by $$F_1=f_{r1}R_n-f_yv. \quad (21)$$

Thus, the target range and velocity can be calculated based on Equations (22) and (23) in the down-chirp stepped-frequency FMCW waveform, as shown below.

$$R=(F_1+F_2)/(f_{r1}+f_{r2}) \quad (22)$$

$$V=(F_2+Rf_{r1})/f_{r2} \quad (23)$$

Figure 10:
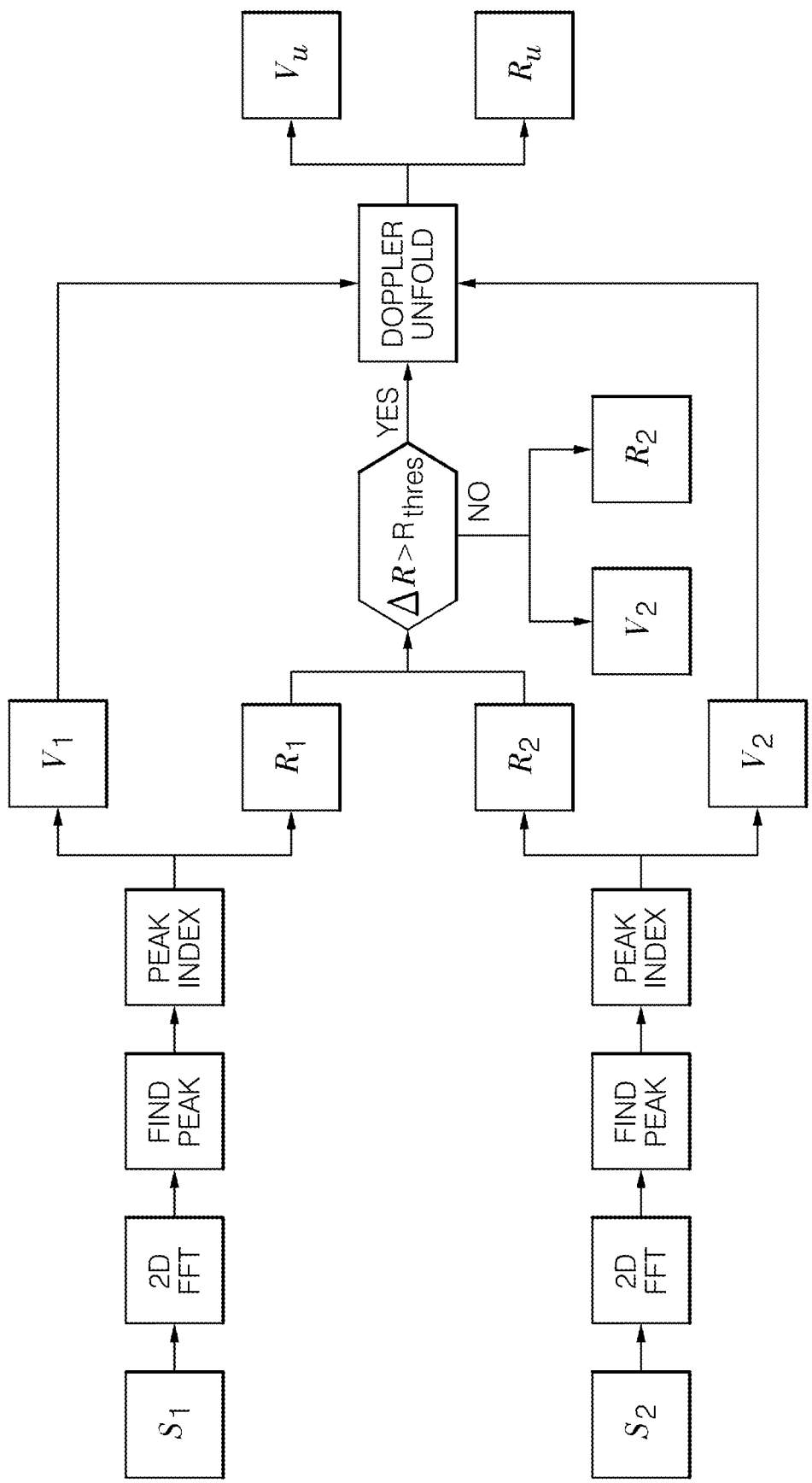
FIG. 10 illustrates an example processing flow of the triangular waveform of FIG. 9.

FIG. 9 illustrates an example of a stepped-frequency FMCW waveform example that uses a triangular fast-chirp waveform to unfold the Doppler aliasing. In this triangular waveform, two directions of the slope are used in one frequency step 306, and the two slopes have the same center frequency. A first chirp sequence of the radar data, $S_1$, contains all the up chirps in one frame; a second chirp sequence of the radar data, $S_2$, contains all the down chirps in one frame. The PRT 304 for the $S_1$ and $S_2$ are $\hat{T}_n = T + \Delta t_n$, in which $\hat{T}_n$ is determined based on the equation, $$\hat{T}_n = \frac{n f_0 \hat{T}_1}{f_0 + n\Delta f} \tag{24}$$

in which n is the chirp index in $S_1$, $f_0$ the center frequency of the first chirp in $S_1$, and $\hat{T}_1 = T + \Delta t_1$, and $\Delta t_n$ is a time delay 308 between the end time of the chirp and the start time of the next chirp. In an example, $\Delta t_1$ is a pre-determined value. When n>1, however, the value of $\Delta t_n$ is changed based on the value of $\hat{T}_n$ from Equation (24). That is, the time delay 308 is varied with each frequency step portion. As a result, the PRT 304 is varied for each frequency step 306 based on the count of the number of repetitions, the initial center frequency, the initial PRT 304, and the frequency step 306. FIG. 10 illustrates a processing flow for the triangular waveform of FIG. 9, in which the signal processing on $S_1$ and $S_2$ are separated. $R_1$ and $R_2$ are range measurements from $S_1$ and $S_2$ by using Equations (17) and (22). $\Delta R = |R_1 - R_2|$ is the range measurement difference between the two sequences. $\Delta$error is defined as the range measurement error when Doppler aliasing does not occur. When the velocity of the target is within the range of $$\frac{-\lambda_0}{4T_0} < v < \frac{\lambda_0}{4T_0},$$

$\Delta R$ would be quite small, as $\Delta R \approx \Delta$error. However, when the target velocity is higher than $$\pm \frac{\lambda_0}{4T_0},$$

all aliased velocity would be used in Equation (17) and (22), which makes $R_1$ and $R_2$ deviate from their true values. With aliasing, the amount of range error between two measurements would be derived by $$R_{thres} = \frac{2pPRF}{f_{r1}}, \tag{25}$$

in which p is the number of times that the target velocity has been folded. It follows that when $\Delta R = R_{thres} >> \Delta r$, Doppler aliasing is indicated. As the value of $\Delta R$ increases, the number of times the Doppler frequency is folded also increases. When Doppler aliasing is detected, an example embodiment includes correcting the Doppler index, and Equation (16) may be expressed as Equation (26) as shown below. After obtaining the corrected Doppler index, the new target range and velocity may be recalculated based on Equations (22) and (23). Then a new set of the target range, Ru, and velocity, Vu, would replace the old $R_1$, $R_2$, $V_1$ and $V_2$ $$F_2 \approx (h+x)f_{bin2} + (b+p)PRF. \tag{26}$$

FIG. 11 illustrates another example of a stepped-frequency FMCW waveform that uses a staggered PRT 304 to unfold the Doppler aliasing. In this example, the chirp sequence, $S_1$, contains all the odd chirps, and $S_2$ contains all the even chirps. $\Delta f_1$ is the frequency step 306 between $S_1$ and $S_2$. $\Delta f_2$ is the frequency step 306 between each chirp within $S_1$. In this example, the chirp length, T, is the same in $S_1$ and $S_2$. Choosing the value of $\Delta f_1$ may be independent of the value of $\Delta f_2$, which means $\Delta f_1$ could be any value suitable for the need of the user, including zero. In an example, when $\Delta f_1$ is equal to zero, there are two identical chirps having the same center frequency in each frequency step 306. In another example, when $\Delta f_1$ does not equal zero, the odd and even chirps do not have the same center frequency. The time delay 308 is indicated by $\Delta t_1$ resulting in a transmission time between $S_1$ and $S_2$ of $T + \Delta t_1$. The PRT 304 for both $S_1$ and $S_2$ are $\hat{T}_n = 2T + \Delta t_1 + \Delta t_{2,n}$, in which $\hat{T}_n$ may be calculated based on $$\hat{T}_n = \frac{n f_0 \hat{T}_1}{f_0 + n\Delta f_2}, \tag{27}$$

in which n is the chirp index in $S_1$, $f_0$ is the center frequency of the first chirp in $S_1$, and $\hat{T}_1 = 2T + \Delta t_1 + \Delta t_{2,1}$. $\Delta t_{2,1}$ is a pre-determined value; however, when n>1, the value of $\Delta t_{2,n}$ would be changed based on the value of $\hat{T}_n$ from Equation (27). That is, the time delay 308 is varied with each frequency step portion. As a result, the PRT 304 is varied for each frequency step 306 based on the count of the number of repetitions, the initial center frequency, the initial PRT 304, and the frequency step 306.

Figure 12:
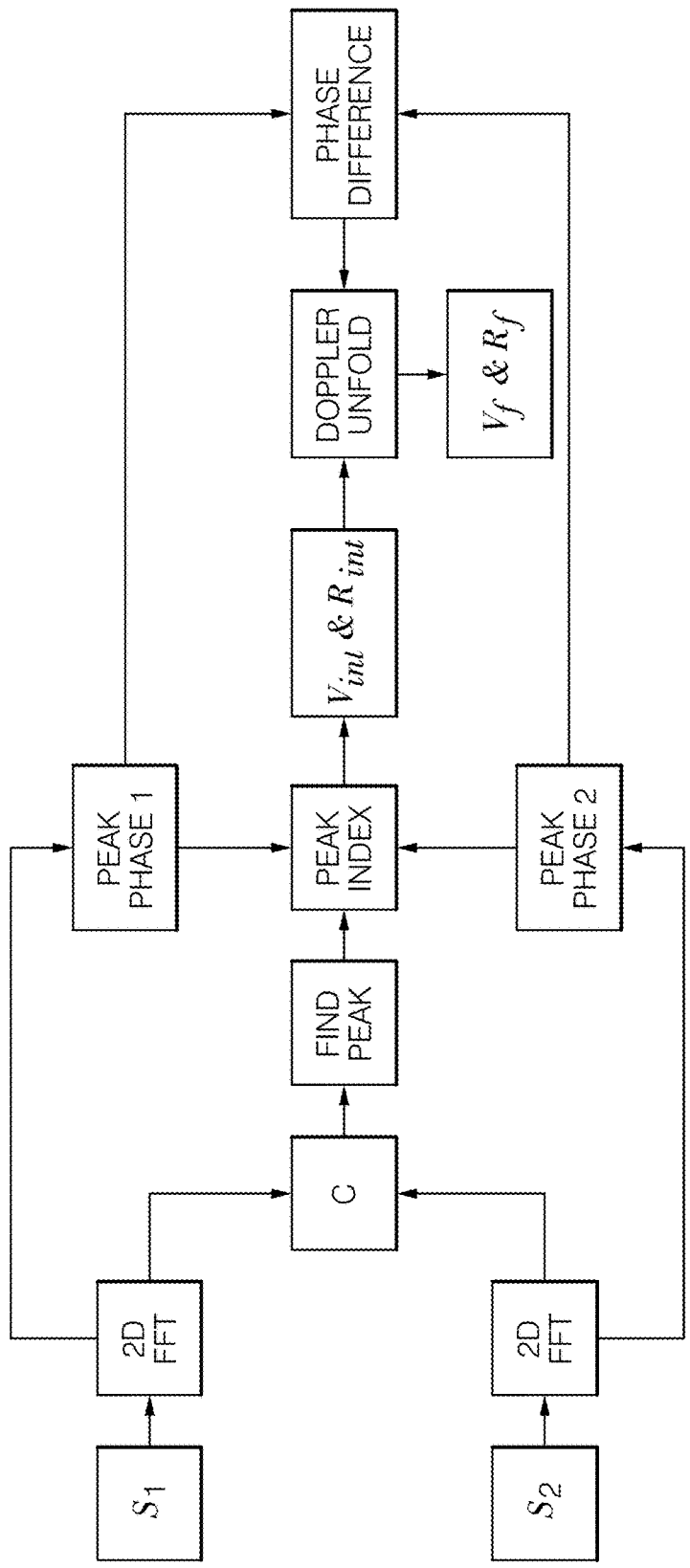
FIG. 12 illustrates an example processing flow of the stepped-frequency waveform of FIG. 11.

FIG. 12 illustrates the processing flow for the staggered PRT 304 stepped-frequency waveform of FIG. 11. In contrast to the processing flow of FIG. 10, a non-coherent integration (NCI) is performed by using the 2D-FFT results from $S1$ and $S_2$, and results in an increase of the SNR by as much as three decibels (3 dB). This 2D matrix after the NCI is represented in FIG. 12 as C, on which a 2D peak searching algorithm may be conducted. Then, the target velocity, $V_{int}$, and target range, $R_{int}$, may be determined from the peak searching algorithm. Since the PRT 304 for $S_1$ and $S_2$ is $\hat{T}$, the Doppler coverage for $V_{int}$ is $$\pm \frac{\lambda}{4\hat{T}},$$

which typically cannot fulfill the requirements in automotive applications. With the help of the phase information from the 2D-FFT of both $S_1$ and $S_2$, the Doppler coverage can be extended. The phase differences between the two peaks of the $S_1$ and $S_2$ are a combination of the target's range and Doppler frequency as shown below $$\Delta\phi = \Delta\phi_d + \Delta\phi_r \tag{28}$$

where $\Delta\phi_d$ and $\Delta\phi_r$ are the target's Doppler and range phase differences, respectively. $\Delta\phi_d$ can be derived from $$\Delta\phi_d = 2\pi \times \left(M + \frac{2V_{int}\hat{T}}{\lambda}\right) \times k \tag{29}$$

where M is a count of the number of times that the target Doppler frequency has been folded, and $k=(T+\Delta t_1)/\hat{T}$. $\Delta \phi_r$ in Equation (28) can be expressed as $$\Delta \phi_r = 2\pi \times \frac{2R_{int}\Delta f_1}{c}. \qquad (30)$$

The $\Delta\phi$ in Equation (28)) can be expressed as $$\Delta\phi = \arg(Ph_{s1} \times Ph_{s2}') \qquad (31)$$

where $Ph_{s1}$ and $Ph_{s2}$ are a row vectors containing the peak complex value from 2D-FFT. The operator ( ) and X represent the matrix conjugate transpose and matrix multiplication, and the operator arg( ) represents the argument of a complex value.

In the Doppler unfolding block shown in FIG. 12, the value of M can be determined from Equation (24), by finding the minimum amount of the $\varepsilon_m$ for each potential that M could be. rem[ ] gives the remainder after the division, $$\varepsilon_m = |rem[(\Delta\phi - \Delta\phi_d - \Delta\phi_r)/2\pi]| \qquad (32)$$

When the value of M has been found, a new target velocity can be calculated as, $$V_f = M\frac{\lambda}{2\hat{T}} + V_{int}. \qquad (33)$$

Since $R_{int}$ is calculated based on an aliasing Doppler frequency, the $R_{int}$ would be biased. So, a correct target range can be calculated as, $$R_f = \left(F_1 + F_2 + \frac{M}{\hat{T}}\right) \bigg/ (f_{r1} + f_{r2}). \qquad (34)$$

Example Method

Figure 13:
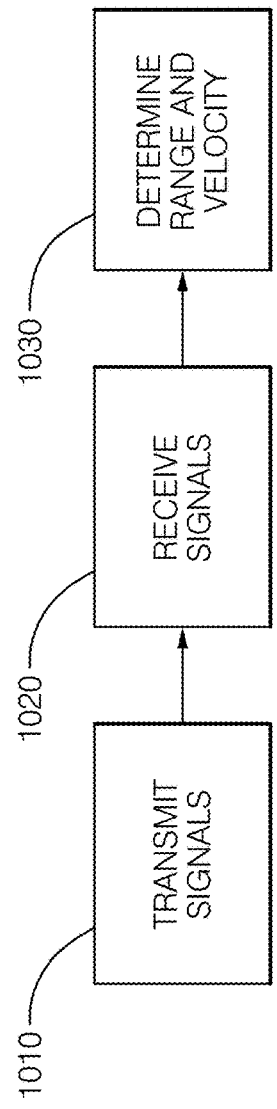
FIG. 13 illustrates an example method of operating an example radar system that is configured to determine object range and velocity from varying radar pulse repetition times.

FIG. 13 illustrates example methods performed by the radar system 102. For example, the processor 204 configures the radar system 102 to perform operations 1010 through 1030 by executing instructions associated with the radar control module 220. The operations (or steps) 1010 through 1030 are performed but not necessarily limited to the order or combinations in which the operations are shown herein. Further, any of one or more of the operations may be repeated, combined, or reorganized to provide other operations.

Step 1010 includes TRANSMIT SIGNALS. This can include transmitting, with a radar system 102, a frame 300 including a series of electromagnetic pulses or chirps (e.g., transmitted signals 106) having a varying PRT 304 between the electromagnetic pulses, and a center frequency that varies by a frequency step 306. The radar system may vary the PRT 304 based on a number of repetitions, an initial center frequency, an initial PRT 304, and the frequency step 306. The radar system 102 transmits the frame 300 by emitting stepped-frequency frequency-modulated continuous wave (FMCW) radar signals.

In an example, the radar system 102 transmits the frame 300 by emitting a first frequency slope and a second frequency slope in a frequency step 306 portion. In this example, the radar system 102 emits the first frequency slope and the second frequency slope having at least one of a same center frequency and a same bandwidth as described above.

In an example, the radar system 102 emits the first frequency slope and the second frequency slope having up-chirp portions having positive slopes. In this example, the radar system 102 separates an end time of the first frequency slope and a start time of the second frequency slope by a time delay 308. In an example, the radar system 102 varies the time delay 308 with each frequency step 306 portion.

In another example, the radar system 102 emits the first frequency slope having an up-chirp portion having a positive slope and emits the second frequency slope having a down-chirp portion having a negative slope. In this example, the radar system 102 emits the first frequency slope and the second frequency slope having a triangular waveform.

Step 1020 includes RECEIVE SIGNALS. For example, step 1020 may include receiving, with the radar system 102, a corresponding series of reflected pulses (e.g., reflected signals 108) that reflect from an object 104 in response to the frame 300 as described above. The reflected signals 108 are received via an antenna array 201 and processed by the processor 204, as described above.

Step 1030 includes DETERMINE RANGE AND VELOCITY. As one example, this can include determining, by the radar system 102, range and velocity information of the object 104 based on the corresponding series of reflected pulses as described above. The signal processing includes 2D-FFT in the first domain and the second domain, as described above. In an example, the radar system 102 may determine the range and velocity information from a single reflected pulse of the corresponding series of reflected pulses. The radar system 102 may also determine a first range resolution of the object 104 based on an individual bandwidth of the electromagnetic pulses within the series of electromagnetic pulses within the frame 300. The radar system 102 may also determine a second range resolution of the object 104 based on a combined bandwidth of the electromagnetic pulses within the series of electromagnetic pulses within the frame 300. In an example, the second range resolution is less than the first range resolution.

Examples

In the following section, examples are provided.

Example 1. A device, comprising: a transmitter configured to transmit a frame including a series of electromagnetic pulses having a varying pulse repetition time between electromagnetic pulses, and a center frequency that varies by a frequency step; a receiver configured to receive a corresponding series of reflected pulses that reflect from an object in response to the frame; and a processor configured to determine range and velocity information of the object based on the corresponding series of reflected pulses.

Example 2. The device of the preceding example, wherein the processor is further configured to determine range and velocity information from a single reflected pulse of the corresponding series of reflected pulses.

Example 3. The device of any of the preceding examples, wherein the processor is further configured to determine a first range resolution of the object based on an individual bandwidth of the electromagnetic pulses within the series of electromagnetic pulses within the frame.

Example 4. The device of any of the preceding examples, wherein the processor is further configured to determine a second range resolution of the object based on a combined bandwidth of the electromagnetic pulses within the series of electromagnetic pulses within the frame.

Example 5. The device of any of the preceding examples, wherein the second range resolution is less than the first range resolution.

Example 6. The device of any of the preceding examples, wherein the transmitter is further configured to vary the pulse repetition time based on a count of a number of repetitions, an initial center frequency, an initial pulse repetition time, and the frequency step.

Example 7. The device of any of the preceding examples, wherein the transmitter is configured to transmit the frame by emitting stepped-frequency frequency-modulated continuous wave (FMCW) radar signals.

Example 8. The device of any of the preceding examples, wherein the transmitter is configured to transmit the frame by emitting a first frequency slope and a second frequency slope in a frequency step portion.

Example 9. The device of any of the preceding examples, wherein the transmitter is configured to emit the first frequency slope and the second frequency slope having a same bandwidth.

Example 10. The device of any of the preceding examples, wherein the transmitter is configured to emit the first frequency slope and the second frequency slope having up-chirp portions having positive slopes.

Example 11. The device of any of the preceding examples, wherein the transmitter is configured to emit the first frequency slope and the second frequency slope having a same center frequency.

Example 12. The device of any of the preceding examples, wherein the transmitter is configured to separate an end time of the first frequency slope and a start time of the second frequency slope by a time delay.

Example 13. The device of any of the preceding examples, wherein the transmitter is configured to vary the time delay with each frequency step portion.

Example 14. The device of any of the preceding examples, wherein the transmitter is configured to emit the first frequency slope having an up-chirp portion having a positive slope and the second frequency slope having a down-chirp portion having a negative slope.

Example 15. The device of any of the preceding examples, wherein the transmitter is configured to emit the first frequency slope and the second frequency slope having a same center frequency.

Example 16. The device of any of the preceding examples, wherein the transmitter is configured to emit the first frequency slope and the second frequency slope having a triangular waveform wherein the individual triangular waveforms are separated by a time delay.

Example 17. A method comprising: transmitting, with a radar system, a frame including a series of electromagnetic pulses having a varying pulse repetition time between electromagnetic pulses, and a center frequency that varies by a frequency step; receiving, with the radar system, a corresponding series of reflected pulses that reflect from an object in response to the frame; and determining, by the radar system, range and velocity information of the object based on the corresponding series of reflected pulses.

Example 18. The method of the preceding example, further comprising, determining, with the radar system, range, and velocity information from a single reflected pulse of the corresponding series of reflected pulses.

Example 19. The method of any of the preceding examples, further comprising, determining, with the radar system, a first range resolution of the object based on an individual bandwidth of the electromagnetic pulses within the series of electromagnetic pulses within the frame.

Example 20. The method of any of the preceding examples, further comprising, determining, with the radar system, a second range resolution of the object based on a combined bandwidth of the electromagnetic pulses within the series of electromagnetic pulses within the frame.

Example 21. The method of any of the preceding examples, wherein the second range resolution is less than the first range resolution.

Example 22. The method of any of the preceding examples, further comprising: varying, with the transmitter, the pulse repetition time based on a count of a number of repetitions, an initial center frequency, an initial pulse repetition time, and the frequency step.

Example 23. The method of any of the preceding examples, wherein the radar system is configured to transmit the frame by emitting stepped-frequency frequency modulated continuous wave (FMCW) radar signals.

Example 24. The method of any of the preceding examples, wherein the radar system is configured to transmit the frame by emitting a first frequency slope and a second frequency slope in a frequency step portion.

Example 25. The method of any of the preceding examples, wherein the radar system is configured to emit the first frequency slope and the second frequency slope having a same bandwidth.

Example 26. The method of any of the preceding examples, wherein the radar system is configured to emit the first frequency slope and the second frequency slope having up-chirp portions having positive slopes.

Example 27. The method of any of the preceding examples, wherein the radar system is configured to emit the first frequency slope and the second frequency slope having a same center frequency.

Example 28. The method of any of the preceding examples, wherein the radar system is configured to separate an end time of the first frequency slope and a start time of the second frequency slope by a time delay.

Example 29. The method of any of the preceding examples, wherein the radar system is configured to vary the time delay with each frequency step portion.

Example 30. The method of any of the preceding examples, wherein the radar system is configured to emit the first frequency slope having an up-chirp portion having a positive slope and the second frequency slope having a down-chirp portion having a negative slope.

Example 31. The method of any of the preceding examples, wherein the radar system is configured to emit the first frequency slope and the second frequency slope having a same center frequency.

Example 32. The method of any of the preceding examples, wherein the radar system is configured to emit the first frequency slope and the second frequency slope having a triangular waveform wherein the individual triangular waveforms are separated by a time delay.

Example 33. A system comprising: means for transmitting a radar frame including a series of electromagnetic pulses having a varying pulse repetition time between two electromagnetic pulses in the series, and a center frequency that varies by a frequency step; means for receiving a corresponding series of reflected pulses that reflect from an object in response to the radar frame; and means for determining range and velocity information of the object based on the corresponding series of reflected pulses.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation, unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A device, comprising:
   a transmitter configured to transmit a radar frame including a series of electromagnetic pulses having a varying pulse repetition time between each electromagnetic pulse in the series, and each electromagnetic pulse in the series having a center frequency that varies by a frequency step from the other electromagnetic pulses in the series, the pulse repetition time being based on the frequency step of the respective electromagnetic pulse;
   a receiver configured to receive a corresponding series of reflected pulses that reflect from an object in response to the radar frame; and
   a processor configured to determine range and velocity information of the object based on the corresponding series of reflected pulses, the range information based on a single reflected pulse of the corresponding series of reflected pulses and on combined reflected pulses of the series of reflected pulses;
   wherein the transmitter is further configured to vary the pulse repetition time based on a count of a number of repetitions, an initial center frequency, and an initial pulse repetition time.

2. The device in accordance with claim 1, wherein the processor is further configured to determine a first range resolution of the object based on an individual bandwidth of the electromagnetic pulses within the series of electromagnetic pulses within the frame.

3. The device in accordance with claim 2, wherein the processor is further configured to determine a second range resolution of the object based on a combined bandwidth of the electromagnetic pulses within the series of electromagnetic pulses within the frame.

4. The device in accordance with claim 3, wherein the second range resolution is less than the first range resolution.

5. The device in accordance with claim 1, wherein the transmitter is configured to transmit the frame by emitting stepped-frequency frequency modulated continuous wave (FMCW) radar signals.

6. The device in accordance with claim 1, wherein the transmitter is configured to transmit the frame by emitting a first frequency slope and a second frequency slope in a frequency step portion.

7. The device in accordance with claim 6, wherein the transmitter is configured to emit the first frequency slope and the second frequency slope having a same bandwidth.

8. The device in accordance with claim 7, wherein the transmitter is configured to emit the first frequency slope and the second frequency slope having up-chirp portions having positive slopes.

9. The device in accordance with claim 8, wherein the transmitter is configured to emit the first frequency slope and the second frequency slope having a same center frequency.

10. The device in accordance with claim 8, wherein the transmitter is configured to separate an end time of the first frequency slope and a start time of the second frequency slope by a time delay.

11. The device in accordance with claim 10, wherein the transmitter is configured to vary the time delay with each frequency step portion.

12. The device in accordance with claim 7, wherein the transmitter is configured to emit the first frequency slope having an up-chirp portion having a positive slope and the second frequency slope having a down-chirp portion having a negative slope.

13. The device in accordance with claim 12, wherein the transmitter is configured to emit the first frequency slope and the second frequency slope having a same center frequency.

14. The device in accordance with claim 13, wherein the transmitter is configured to emit the first frequency slope and the second frequency slope forming a triangular waveform, wherein the triangular waveform further includes a time delay.

15. A method, comprising
   transmitting, with a radar system, a frame including a series of electromagnetic pulses having a varying pulse repetition time between each electromagnetic pulse in the series, and each electromagnetic pulse in the series having a center frequency that varies from the center frequency of the other electromagnetic pulses in the series by a frequency step, the pulse repetition time based on the frequency step of the respective electromagnetic pulse;
   receiving, with the radar system, a corresponding series of reflected pulses that reflect from an object in response to the frame;
   determining, by the radar system, range and velocity information of the object based on the corresponding series of reflected pulses, the range information based on a single reflected pulse of the corresponding series of reflected pulses and on combined reflected pulses of the series of reflected pulses; and
   varying, with the radar system, the pulse repetition time based on a count of a number of repetitions, an initial center frequency, and an initial pulse repetition time.

16. The method in accordance with claim 15, including determining, with the radar system, a first range resolution of the object based on an individual bandwidth of the electromagnetic pulses within the series of electromagnetic pulses within the frame.

17. The method in accordance with claim 16, including determining, with the radar system, a second range resolution of the object based on a combined bandwidth of the electromagnetic pulses within the series of electromagnetic pulses within the frame.

18. The method in accordance with claim 17, wherein the second range resolution is less than the first range resolution.

19. The method in accordance with claim 15, wherein the radar system is configured to transmit the frame by emitting stepped-frequency frequency modulated continuous wave (FMCW) radar signals.

20. The method in accordance with claim 15, wherein the radar system is configured to transmit the frame by emitting a first frequency slope and a second frequency slope in a frequency step portion.

21. A system comprising:
a processor configured to:
 control a transmitter to transmit a radar frame including a series of electromagnetic pulses having a varying pulse repetition time between each electromagnetic pulse in the series, and each electromagnetic pulse in the series having a center frequency that varies from the center frequency of the other electromagnetic pulses in the series by a frequency step, the pulse repetition time based on the frequency step of the respective electromagnetic pulse;
 control a receiver to receive a corresponding series of reflected pulses that reflect from an object in response to the radar frame;
 determine range and velocity information of the object based on the corresponding series of reflected pulses, the range information based on a single reflected pulse of the corresponding series of reflected pulses and on combined reflected pulses of the series of reflected pulses; and
 vary the pulse repetition time based on a number of repetitions, an initial center frequency, and an initial pulse repetition time.

22. The system of claim 21, wherein the processor is further configured to determine a first range resolution of the object based on an individual bandwidth of the electromagnetic pulses within the series of electromagnetic pulses within the frame.

23. The system of claim 22, wherein the processor is further configured to determine a second range resolution of the object based on a combined bandwidth of the electromagnetic pulses within the series of electromagnetic pulses within the frame.

* * * * *